United States Patent [19]
Smorodinsky et al.

[11] Patent Number: 6,055,574
[45] Date of Patent: Apr. 25, 2000

[54] METHOD OF PROVIDING A SERVICE THROUGH A SERVER WITH A VIRTUAL SINGLE NETWORK ADDRESS

[75] Inventors: Lev Smorodinsky, Laguna Hills; James Walter Thompson, Mission Viejo, both of Calif.

[73] Assignee: Unisys Corporation, Blue Bell, Pa.

[21] Appl. No.: 09/041,067

[22] Filed: Mar. 10, 1998

[51] Int. Cl.[7] ............................. G06F 13/38; G06F 15/17
[52] U.S. Cl. ......................... 709/226; 709/104; 709/105; 709/201; 709/204; 709/227; 709/228; 709/229; 709/244; 709/245; 709/249
[58] Field of Search ..................... 709/105, 201, 709/229, 249, 104, 245, 244, 226, 227, 228, 204

[56] References Cited

U.S. PATENT DOCUMENTS

| | | | |
|---|---|---|---|
| 5,025,491 | 6/1991 | Tsuchiya et al. | 340/825.52 |
| 5,590,285 | 12/1996 | Krause et al. | 709/210 |
| 5,729,689 | 3/1998 | Allard et al. | 709/228 |
| 5,764,789 | 6/1998 | Pare, Jr. et al. | 382/115 |
| 5,768,501 | 6/1998 | Lewis | 395/185.01 |
| 5,774,660 | 6/1998 | Brendel et al. | 709/201 |
| 5,825,772 | 10/1998 | Dobbins et al. | 370/396 |
| 5,881,238 | 3/1999 | Aman et al. | 709/226 |
| 5,884,038 | 3/1999 | Kapoor | 709/226 |
| 5,923,853 | 7/1999 | Danneels | 709/238 |
| 5,923,854 | 7/1999 | Bell et al. | 709/243 |
| 5,931,900 | 8/1999 | Notani et al. | 709/201 |
| 5,937,163 | 8/1999 | Lee et al. | 709/218 |
| 5,961,620 | 10/1999 | Trent et al. | 710/105 |
| 5,974,453 | 10/1999 | Andersen et al. | 709/220 |
| 5,978,853 | 11/1999 | Crayford et al. | 709/245 |
| 5,996,016 | 11/1999 | Thalheimer et al. | 709/227 |

FOREIGN PATENT DOCUMENTS 2305747  9/1995  United Kingdom  ..........  G06F 15/177

OTHER PUBLICATIONS

Request for comment for Open Shortest Path First (OSPF), version 2, J. Moy,http://www.sunsite.auc.dk/RFC/rfc/rfc1247.html, 314 pages, Jul. 1991.

*Primary Examiner*—Frank J. Asta
*Assistant Examiner*—Bunjob Jaroenchonwanit
*Attorney, Agent, or Firm*—Charles J. Fassbender; Mark T. Starr; Steven B. Samuels

[57] ABSTRACT

A method of providing a service, to a plurality of terminals on a communication network, through a server on the communication network includes the following steps: 1) coupling a correlator to the network which links a unique name for the server to multiple network addresses; 2) providing a set of multiple computers on the network, each of which performs the service and is assigned a different one of the multiple network addresses; and, 3) incorporating a network address selector on the network which directs any one of the terminals to a single one of the computers, when an operator of that one terminal generates a request for the service which includes the unique name of the server. Due to this method, the server has a virtual single network address which means that from the point of view of an operator of a terminal, the service is being provided by a single computer on the network that has a single network address that corresponds to the server's unique name. But in reality, the requested service is being provided to the terminal by different computers at different times, depending upon which computer is selected by the network address selector.

14 Claims, 6 Drawing Sheets

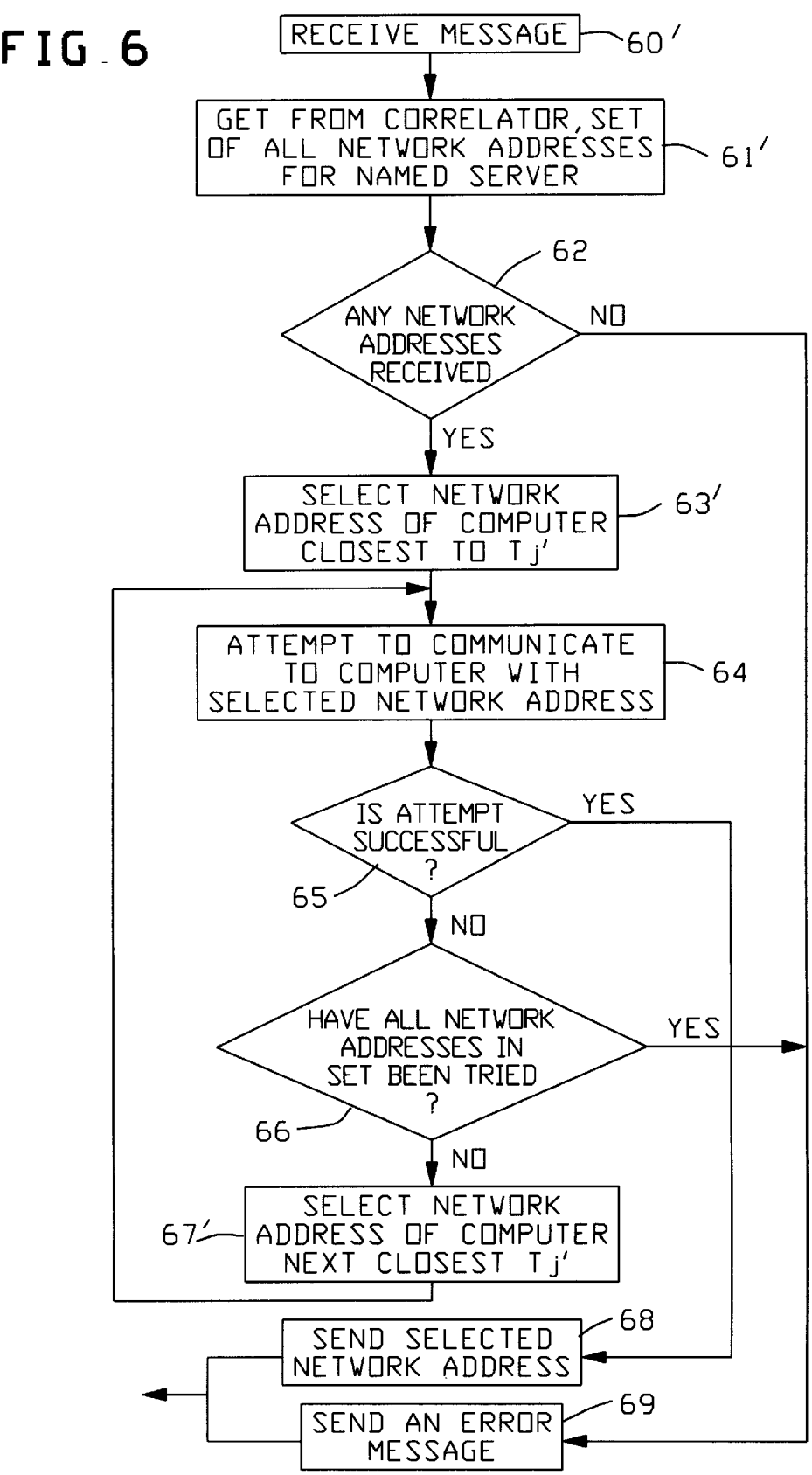

METHOD OF PROVIDING A SERVICE THROUGH A SERVER WITH A VIRTUAL SINGLE NETWORK ADDRESS

BACKGROUND OF THE INVENTION

This invention relates to methods of providing a service from a server on a communication network to any one of a plurality of terminals that connect to the network.

To obtain the service at a particular terminal, an operator of the terminal generates a request for the service. One part of this request identifies the service that is requested, and another part of the request names the server which provides the service.

In the prior art, such a request for service has been generated by using a keyboard on the terminal to identify the requested service and the name of the server which provides the service. Also in the prior art, such a request has been generated by using a mouse to position a cursor on an icon that corresponds to the requested service from the named server, and clicking on that icon.

One example of the above type of communication network is the Internet. There, millions of operators generate requests for services from thousands of different servers, and each server has a unique name. An example of such a request on the Internet is http://www.microsoft.com.

Before the server which is named in a request can provide the requested service, that name must be converted to a network address which is assigned to the server. For example, the network address that corresponds to the server named www.microsoft.com is 207.68.156.49. This address for the server is not generated by the operator of a terminal because it is not "user friendly". It is much easier for the terminal's operator to simply remember the server's name.

In the prior art, various mechanisms are available which automatically convert the name of a server to a single network address. One such mechanism is the Internet Domain Name Service (DNS), and another is the Windows Internet Name Service (WINS).

After the server's name is converted to a single network address, the requested service is often provided by a single computer on the network which is assigned that network address. However, one problem with providing the service from a single computer is that when the computer breaks, all of the terminals on a network are unable to obtain the service. Also, another problem with providing a service from a single computer is that the computer becomes overloaded when a large number of terminals on the network request the service at the same time. Consequently, the service is degraded or rejected.

To address these problems in the prior art, servers have been disclosed which are comprised of a group of several computers that are intercoupled in a cluster. See for example, FIG. 2 of U.S. Pat. No. 5,371,852. There, the cluster comprises a plurality of computers 105 thru 109, and computer 109 acts as a gateway which interfaces the communication network to the computers 105 thru 108.

With the above cluster server, any one of the computers 105 thru 108 can fail and service can still be obtained from the remaining computers that operate. However, a drawback of the cluster server is that if the gateway computer 109 fails, then none of the other computers 105 thru 108 are able to provide the requested service.

Also, another drawback of the cluster server is that it requires the additional gateway computer 109 and additional software; and that can significantly increase the initial cost of the cluster and the cost of its maintenance. Further, this additional cost is incurred each time a new cluster server is added to the network in order to provide a new service.

Accordingly, an object of the present invention is to provide a novel method of providing a service on a communication network in which the above prior art problems are overcome.

BRIEF SUMMARY OF THE INVENTION

In accordance with the present invention, a method of providing a service through a server on a communication network includes the following steps: 1) coupling a correlator to the network which links a unique name for the server to multiple network addresses; 2) providing a set of multiple computers on the network, each of which performs the service and is assigned a different one of the multiple network addresses; and, 3) incorporating a network address selector on the network which directs any one terminal to a single one of the computers, when an operator of that one terminal generates a request for the service which includes the unique name of the server. This directing step is performed by the substeps of, a) receiving from the correlator, the multiple network addresses that are linked to the unique name for the server, b) attempting to communicate over the network to the computers with the multiple network addresses, c) selecting a single computer that communicates successfully with the network address selector in the attempting step, and d) providing that one terminal with the network address of the selected computer.

One feature of the present invention is that the server has a virtual single network address. This means that from the point of view of an operator of a terminal, the service is being provided by a single computer on the network which has a single network address that corresponds to the server's unique name. In reality however, the requested service is being provided to the terminal by different computers at different times, depending upon which computer is selected by the network address selector.

Another feature of the present invention is that anyone of the multiple computers can fail and the remaining computers which are operational will continue to provide the requested service. This feature is achieved by the above substeps a) thru d) wherein an attempt to communicate to anyone of the computers which is broken will be overcome by the attempts to communicate with the remaining computers.

Also, another feature of the present invention is that new services can be added to the network with a low cost. To add a new service, a second set of multiple computers are coupled to the network which perform the new service, and a new server name plus respective network addresses for the second set of computers is simply stored in the correlator. No additional gateway computer is needed, as is the case when a prior art cluster server is added to the network.

BRIEF DESCRIPTION OF THE DRAWINGS

FIG. 6 shows another modification which can be made to the steps that are performed by the network address selector of FIG. 4.

DETAILED DESCRIPTION

Figure 1:
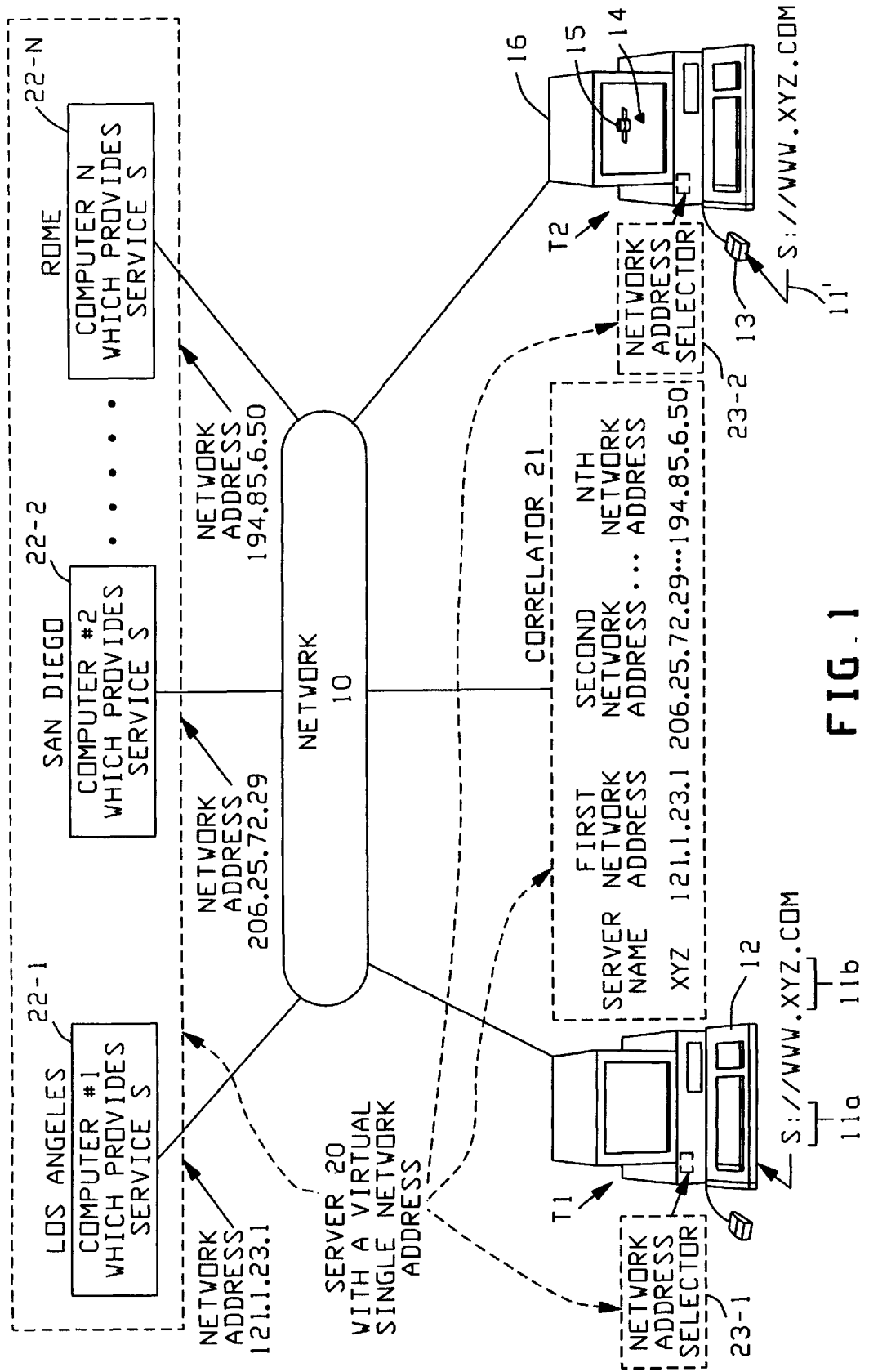
FIG. 1 shows a server 20, with a virtual single network address, which constitutes one preferred embodiment of the present invention.

In FIG. 1, reference numeral 10 identifies a communication network to which hundreds of terminals can be coupled. Only two such terminals are shown in FIG. 1 as terminals T1 and T2.

An operator of the terminals T1 and T2 can obtain a service over the network 10 by generating a request for the service. One part of this request identifies the service that is requested, and another part names a server which provides the service.

For example, reference numeral 11 in FIG. 1 identifies a request for a service which is generated via a keyboard 12 on terminal T1. Portion 11a of this request 11 names the particular service S that is being requested, and portion 11b names the server XYZ which provides the requested service. All remaining portions of the request 11 (such as ://) are control characters which are shown for completeness but are not relevant to the invention.

This same service S can also be requested by an operator of a terminal in a different manner. For example, reference numeral 11' indicates a request which is generated by an operator of the terminal T2 by using a mouse 13 to position a cursor 14 on an icon 15 that corresponds to the service S, and then clicking on the icon. This icon 15 is displayed on a monitor 16 in the terminal T2.

Now in accordance with the present invention, the service S that is requested via the terminals T1 and T2 is provided in FIG. 1 by a novel server 20. This server 20 is comprised of a correlator 21, multiple computers 22-1 thru 22-N, and a respective network address selector 23-1 thru 23-2 for each terminal.

As FIG. 1 shows, the correlator 21 is a separate module which is coupled to the network 10. This correlator 21 links the name XYZ of the server to multiple network addresses on the network 10. For example, in FIG. 1, the server name XYZ is linked to a first network address of 121.1.23.1, a second network address of 206.25.72.29, ... and an Nth network address of 194.85.6.50.

Also as FIG. 1 shows, the computers 22-1 thru 22-N are coupled to the network 10 at a variety of spaced-apart locations. For example, computer 22-1 is coupled to the network 10 in Los Angeles; computer 22-2 is coupled to the network 10 in San Diego; ... and computer 22-N is coupled to the network 10 in Rome.

Each of the computers 22-1 thru 22-N is assigned a different one of the multiple network addresses which are linked to the server name XYZ by the correlator 21. In FIG. 1, computer 22-1 is assigned the first network address; computer 22-2 is assigned the second network address; ... and computer 22-N is assigned the Nth network address.

Also, each of the computers 22-1 thru 22-N is programmed such that it can individually provide the service S. To obtain the service S from one particular computer 22-i, that service is requested over the network 10 by using the i-th network address.

When terminal T1 generates a request for the service S from the server XYZ, the network address selector 23-1 selects a single one of the computers 22-1 thru 22-N to provide that service. Similarly, when the terminal T2 generates a request for the service S from the server XYZ, the network address selector 23-2 selects a single one of the computers 22-1 thru 22-N to provide the requested service. How the network address selectors 23-1 and 23-2 perform the above task is illustrated in FIG. 2.

Figure 2:
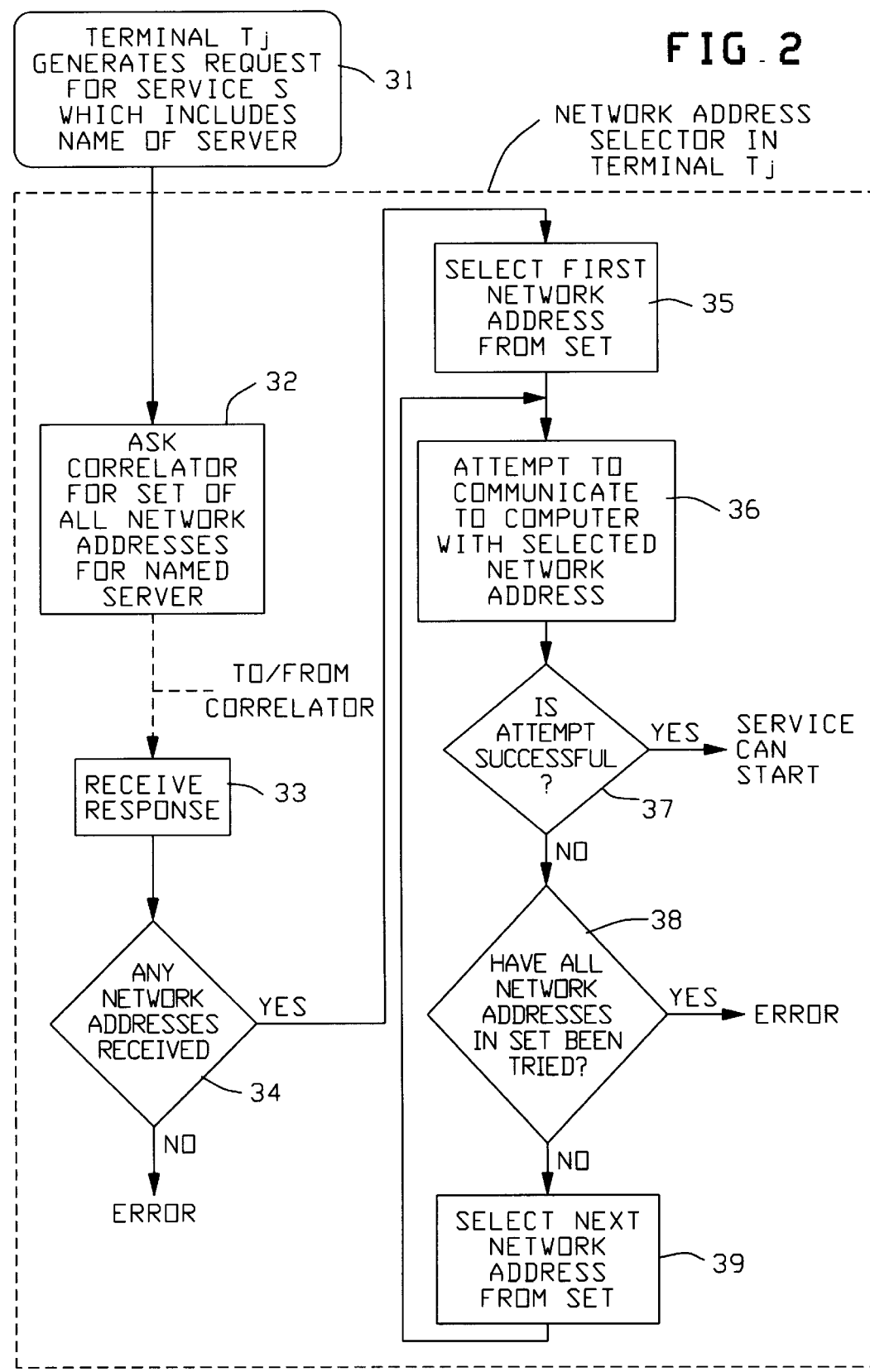
FIG. 2 shows a series of steps that are performed by a network address selector which is a key component in the FIG. 1 Server.

Initially, as indicated by step 31 in FIG. 2, a terminal on the network 10 generates a request for the service S which includes the server name XYZ. This terminal which generates the request is designated in FIG. 2 as terminal Tj, where j=1,2, etc.; and integrated into that terminal is the network address selector 23-j.

In response to the request by terminal Tj, the network address selector 23-j asks the correlator 21 for the set of all of the network address that correspond to the server name XYZ. This occurs in step 32 in FIG. 2.

Thereafter, in step 33, the network address selector 23-j receives a response over the network 10 from the correlator 21. This response is then examined by the network address selector 23-j as is indicated by step 34.

Normally, multiple network addresses are received from the correlator 21 for the server name XYZ. In that case, the "yes" branch is taken in step 34 and steps 35–39 are performed. If however, the server name XYZ and its network addresses are not stored in the correlator 21, then the "no" branch is taken in step 34, and an error message is displayed in the terminal Tj.

In step 35 of FIG. 2, the network address selector 23-j selects the first network address from the set of multiple network addresses that it received from the correlator 21. Then in step 36, the network address selector 23-j attempts to communicate over the network 10 to the computer which is assigned the selected network address.

If the above attempt to communicate is successful, then the terminal Tj can start to receive the service S from the computer which has the network address that was used in step 36. This is indicated by the "yes" branch of step 37. Conversely, if the attempt to communicate in step 36 is not successful, then the "no" branch is taken from step 37 to step 38.

In step 38, the network address selector 23-j examines the set of network addresses that it received from the correlator 21. If the network address selector 23-j has already used all of those network addresses in step 36, then the "yes" branch is taken from step 38 and an error message is displayed in the terminal T1. Otherwise, the "no" branch is taken from step 38 to step 39.

In step 39 the network address selector 23-j selects the next network address from the set which it received from the correlator 21. Then the network address selector 23-J repeats the execution of steps 36–39 until the "yes" branch is taken from step 37 or step 38.

One feature of the above-described server 20 is that it has a virtual single network address. This means that from the point of view of an operator of the terminal Tj, the service S is being provided by a single computer on the network 10 which has a single network address that corresponds to the server name XYZ. In reality however, the requested service S is being provided to the terminal Tj by computer 22-1 at one time, by computer 22-2 at another time, ... etc., depending upon which computer is selected by the network address selector 23-j.

Another feature of the server 20 is that anyone of the multiple computers 22-1 thru 22-N can fail, and the remaining computers which are operational will continue to provide the requested service. This feature is achieved by steps 35–39 in FIG. 2 wherein an attempt to communicate to anyone of the computers 22-1 thru 22-N which is broken will be overcome by the attempts to communicate with the remaining computers.

Also, another feature of the server 20 is that new services can be added to the network with a low cost. To add a new service, a second set of multiple computers (similar to the computers 22-1 thru 22-N) are coupled to the network 10 which perform the new service, and a new server name plus respective network addresses for the second set of computers is simply stored in the correlator 21. No additional gateway computer is needed, as is the case when a prior art cluster server is added to the network.

Figure 3:
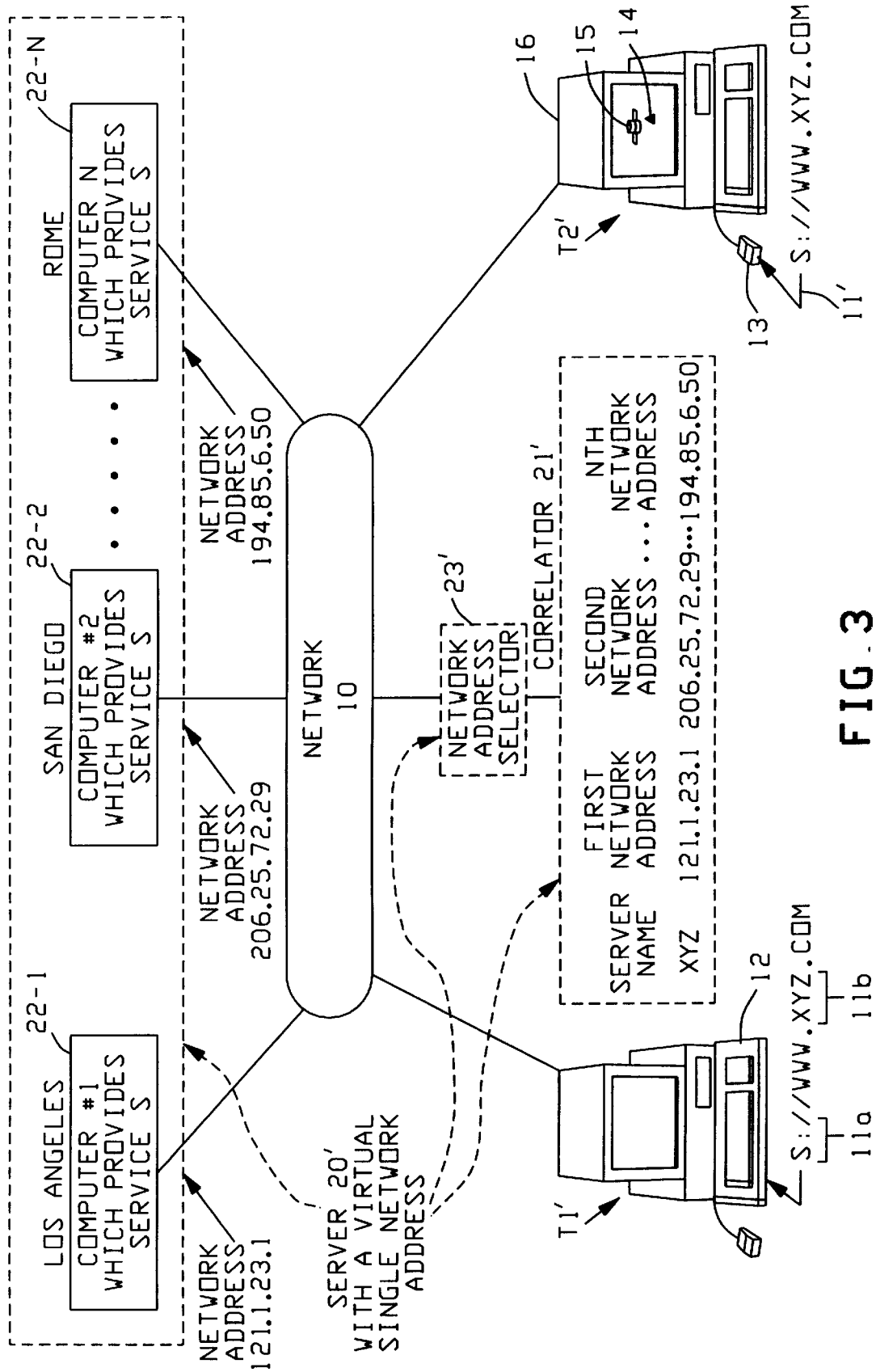
FIG. 3 shows a server 20', with a virtual single network address, which constitutes a second preferred embodiment of the present invention.

Turning now to FIG. 3, it shows a novel server 20' which constitutes a second embodiment of the present invention. This server 20' is comprised of a correlator 21', multiple computers 22-1 thru 22-N, and a single network address selector 23'.

Correlator 21' is similar to correlator 21 of the FIG. 1 embodiment in that both correlators link the server name XYZ to the same set of multiple network addresses on the network 10. However, the correlator 21' in FIG. 3 is connected to the network address selector 23', whereas the correlator 20 in FIG. 1 is connected to the network 10.

All of the computers 22-1 thru 22-N in the FIG. 3 embodiment are identical to the computers 22-1 thru 22-N of the FIG. 1 embodiment. For example, computer 22-1 in both the FIG. 3 embodiment and the FIG. 1 embodiment is located in Los Angeles, is assigned the network address of 121.1.23.1, and provides the service S.

Network address selector 23' of the FIG. 3 embodiment is similar to each network address selector in the FIG. 1 embodiment; however, in the FIG. 3 embodiment there is only a single network address selector. This single network address selector 23' is a separate module which is connected to the network 10 and to the correlator 21' as shown in FIG. 3.

All of the terminals in FIG. 3 which generate a request for the service S are the same as the terminals in the FIG. 1, except that each terminal in FIG. 3 does not have its own network address selector. To indicate this difference, the terminals in FIG. 3 are designated T1' and T2'; rather than T1 and T2.

Figure 4:
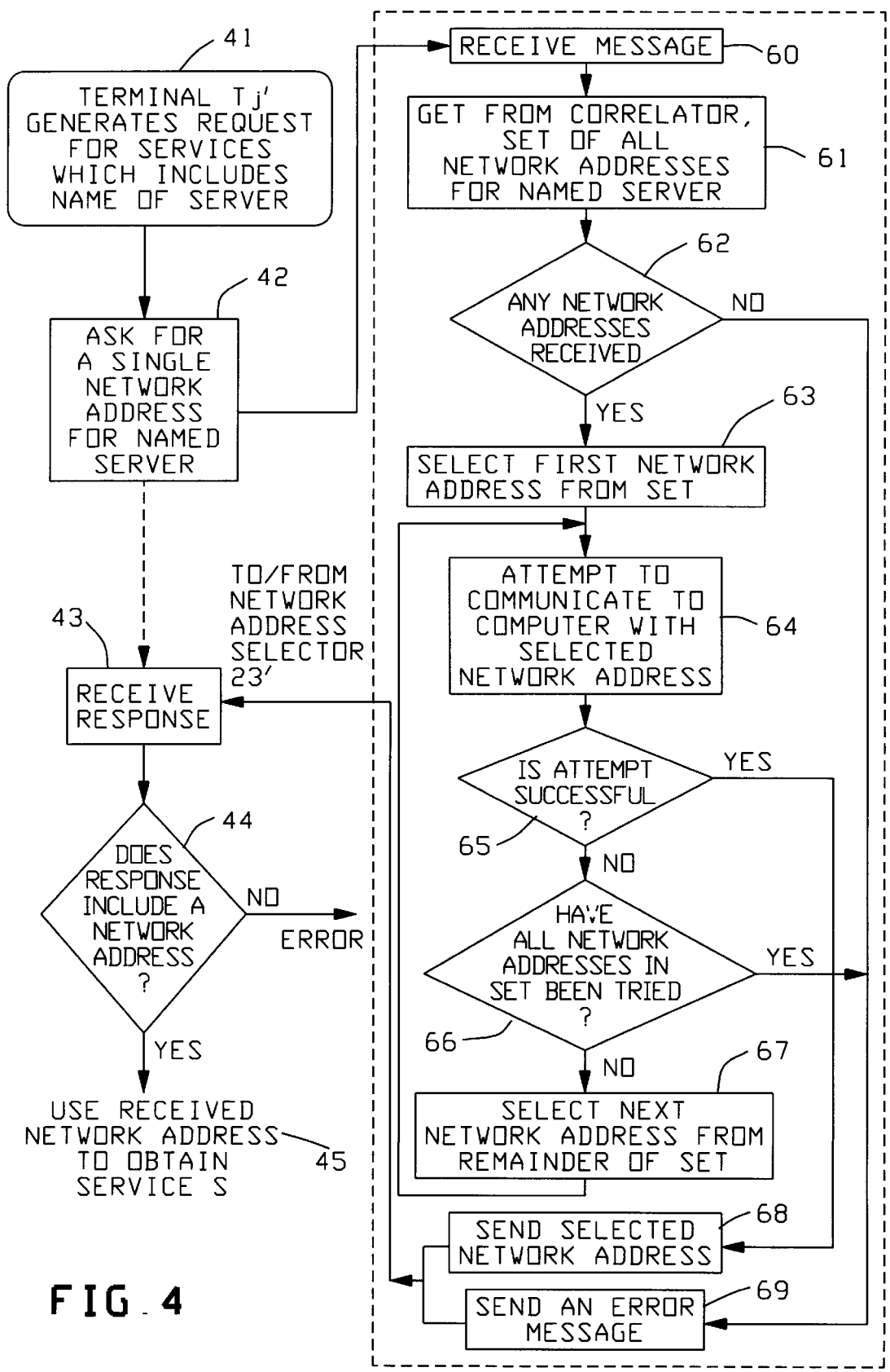
FIG. 4 shows a series of steps that are performed by a network address selector which is a key component in the FIG. 3 server.

How server 20' operates is shown in FIG. 4. Initially, as indicated by step 41, a terminal on the network 10 generates a request for the service S which includes the server name XYZ. This terminal which generates the request is designated in FIG. 4 as terminal Tj', where j=1, 2, etc.

Then, in step 42, the terminal Tj' sends a message over the network 10 to the network address selector 23'; and this message asks for a single network address for the named server XYZ. This message is received by the network address selector 23' in step 60 of FIG. 4. Then, in response to the received message, the network address selector 23' performs a sequence of steps which are shown in FIG. 4 as steps 61–69.

In step 61, the network address selector 23' obtains the set of all network addresses which is stored in the correlator for the server that is named XYZ. If the correlator 21' stores no network addresses for the server XYZ, then the "no" branch is taken in step 62, and an error message is sent back to the terminal Tj' in step 69. Otherwise, the "yes" branch is taken in step 62 to step 63.

In step 63, the network address selector 23' selects the first network address from the set of addresses which it received in step 61. Then, in step 64, the network address selector 23' attempts to communicate over the network 10 to the single one of the computers 22-1 thru 22-N which is assigned the selected network address.

If the attempt to communicate in step 64 is successful, then the communication link which is there established is terminated, and the "yes" branch is taken from step 65 to step 68. Then, the network address selector 23' sends to the terminal Tj', the network address of the computer with which it communicated successfully in step 64.

Conversely, if the attempt to communicate in step 64 is not successful, then the "no" branch is taken from step 65 to step 66. There, the network address selector 23' examines the set of network addresses that it received from the correlator in step 61. If the network address selector 23' has already used all of those network addresses in step 64, then the "yes" branch is taken to step 69, and an error message is sent to the terminal Tj'. Otherwise, the "no" branch is taken from step 66 to step 67.

In step 67, the network address selector 23' selects the next network address from the set which it received in step 61. Then the network address selector 23' repeats the execution of steps 64–67 until a branch is taken to step 68 or step 69.

When a message is sent in step 68 or step 69, that message is received by the terminal Tj' in step 43. This message is then examined by the terminal Tj' in step 44 to determine if it contains a network address as requested in step 42.

If a network address is received in step 43, then terminal Tj' performs step 45. There it communicates over the network 10 to the computer with the received network address and obtains the service S from that computer. Otherwise, the "no" branch is taken from step 44 and an error message is displayed in the terminal Tj'.

Two preferred embodiments of the invention have now been described in detail. In addition, however, certain changes and modifications can be made to these embodiments as will now be described.

Figure 5:
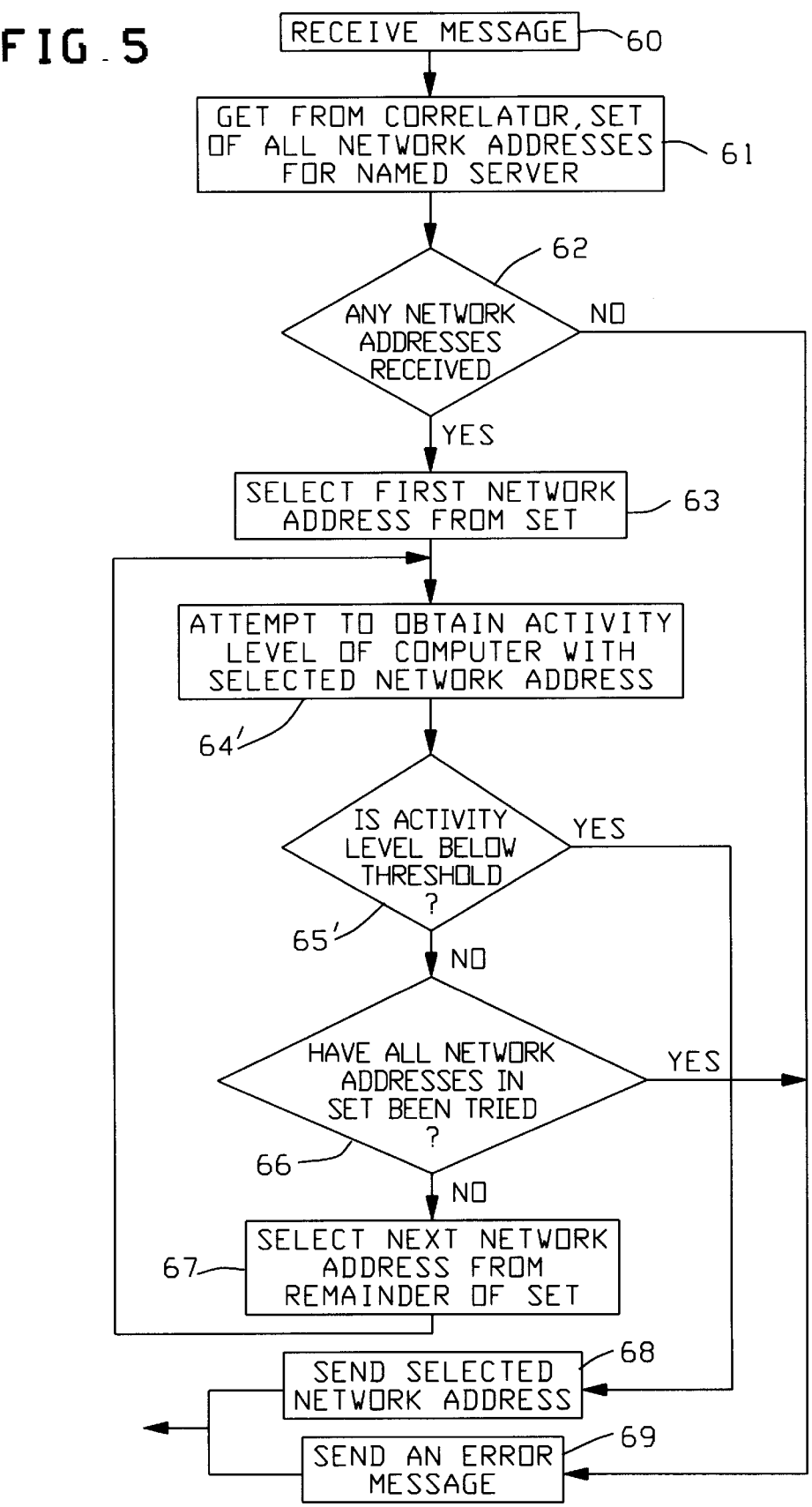
FIG. 5 shows one modification that can be made to the steps which are performed by the network address selector of FIG. 4.

One such modification is shown in FIG. 5. There, all of the steps which are performed by the network address selector 23' of FIG. 4 are repeated with the exception that steps 64 and 65 are modified to steps 64' and 65' respectively.

In step 64', the network address selector attempts to communicate to the computer with the network address which was selected in step 63; and in addition, it asks that computer to indicate its current activity level. In response, the addressed computer can indicate that its current activity level is in a particular range (such as high, medium or low); or the computer can provide a numerical activity metric which varies continuously from a maximum limit to a minimum limit.

In step 65', the network address selector determines whether or not a) the attempt to communicate in step 64' was successful, and b) the computer's current activity level is below a predetermined threshold. If both of those conditions a) and b) are met, then the "yes" branch is taken from step 65' to step 68 where the selected network address is sent to the terminal Tj'.

Also, another modification is shown in FIG. 6. There, all of the steps which are performed by the network address selector 23' of FIG. 4 are repeated with the exception that steps 60, 61, 63 and 67 are modified to steps 60', 61', 63' and 67' respectively.

In step 60', the message which the network address selector receives from the terminal Tj' indicates the server name XYZ plus the physical location of the terminal Tj' on the network 10. Similarly, in step 61' the output from correlator 21' to the network address selector includes the network address and physical location of each of the computers 22-1 thru 22-N.

In step 63', the network address selector examines the set of network addresses that it received from the correlator in step 61; and from that set, it selects the network address of the computer which is closest to the terminal Tj that generated the request for service. To make this determination, the network address selector compares the network address of the terminal Tj to each network address which it received from the correlator.

Similarly, in step 67', the network address selector examines those network addresses that remain from step 61 which were not previously used in the attempted communication of step 64. From those addresses, the network address selector selects the network address of the computer which is closest to the terminal Tj' that made the request for service.

As another modification, step 35 in FIG. 2 can be changed such that a network address is selected at random from the entire set of addresses for the named server; and similarly, step 39 in FIG. 2 can be changed such that a network address is selected at random from the remainder of the set. Due to these changes, the network address selector will attempt to communicate to the computers 22-1 thru 22-N in step 36 in a random order.

An another modification, step 37 in FIG. 2 can be changed such that if the "yes" branch is taken, then the network address selector stores the network address of the computer which communicated successfully with the network address selector in step 36. Thereafter, if the computer Tj generates another request for the same service S, step 35 can be modified such that the stored network address is the address which is selected first.

As another modification, the request for the service S can be generated by any means, and not just by a terminal's keyboard 12 or mouse 13. For example, the request for the service S can be generated by a program within the terminals T1 and T2. Also, the request for the service S can have any format, and not just the format which is indicated by reference numerals 11 and 11' in FIGS. 1 and 3. For example, the control characters of :// and www and com can be replaced with any other control characters. Also the portion of the request which identifies the service S that is being requested can follow the unique name of the server or can be incorporated into the unique name of the server.

As still another modification, the coupling can change in the FIG. 3 embodiment between the network 10, the correlator 21', and the network address selector 23'. For example, both the correlator 21' and the network address selector 23' can be connected directly to the network 10. As another example, just the correlator 21' can connect to the network 10 and the network address selector 23' can connect to just the correlator 21'. As another example, the correlator 21' and the network address selector 23' can be implemented as respective programs that are stored in a single computer which connects to the network 10.

As another modification, each server name and its corresponding set of network addresses can be stored in the correlators 21 and 21' of FIGS. 1 and 3 by a variety of circuits. For example, the server names and network addresses can be stored as a table in a magnetic memory or a semiconductor memory. Preferably, the memory is of a read-write type, rather than a read-only type; and preferably the correlator is adapted to receive control messages from an authorized terminal on the network which specifies the server names and network addresses that get written into the correlator's memory.

As another modification, the network 10 of FIGS. 1 and 3 can be any type of electronic communication network. For example, the network 10 can be accessible by the public (such as the Internet), or it can be accessible only by members of a particular company or organization (such as a company intranet). Similarly, the terminals T1 and T2 in FIGS. 1 and 3 can be any type of electronic terminals.

Accordingly, since many such changes can be made to the illustrated preferred embodiments, it is to be understood that the invention is not limited to just those preferred embodiments, but is defined by the appended claims.

What is claimed is:

1. A method of providing a service, through a server with a virtual single network address, on a communication network having a plurality of terminals that obtain said service by generating a request that includes a unique name for said server; said method including the steps of:

coupling a correlator to said network which links said name for said server to multiple network addresses;

providing multiple computers on said network, each of which performs said service and is assigned a different one of said multiple network addresses; and, incorporating a network address selector on said network which directs any one terminal to a single one of said computers, when said one terminal generates said request for said service, by—a) receiving from said correlator, said multiple network addresses that are linked to said name for said server, b) responding to said request for service from said one terminal by attempting to communicate over said network to said computers with said multiple network addresses, c) selecting a single computers automatically and without human intervention, that communicates successfully with said network address selector in said attempting step, d) providing said one terminal with the network address of the selected computer; and e) establishing a connection from said one terminal to said selected computer by using said network address within said one terminal from said providing step.

2. A method according to claim 1 wherein said network address selector is integrated into each terminal; and said correlator is located on said network separate from each terminal.

3. A method according to claim 1 wherein said network address selector is located on said network separate from each terminal, and said correlator is connected to said network address selector.

4. A method according to claim 1 wherein said correlator links said identifier to said multiple network addresses in a certain order, and said network address selector sequentially attempts to communicate to said computers in said order and connects said one terminal to the computer that is first to communicate successfully.

5. A method according to claim 1 wherein said network address selector attempts to communicate to said computers in a random order, and connects said one terminal to the computer that is first to communicate successfully.

6. A method according to claim 1 wherein said network address selector determines the proximity of said computers to said one terminal, and said network address selector attempts to communicate to said computers in the order of their proximity to said one terminal and connects said one terminal to the computer that is first to communicate successfully.

7. A method according to claim 1 wherein each computer which successfully communicates with said network address selector indicates its degree of availability, and said network address selector provides said one terminal with the network address of the computer which has the highest degree of availability.

8. A method according to claim 1 wherein said network address selector stores the network address of the selected computer, and if said one terminal subsequently generates another request for said service then said network address selector attempts to communicate first to the computer with the stored network address.

9. A method according to claim 1 wherein said correlator also receives control messages from said network and changes which network addresses are linked to said identifier in response to said control messages.

10. A method according to claim 1 wherein said communication network is the Internet.

11. A method according to claim 1 wherein said communication network is an Intranet.

12. A method according to claim 1 wherein said correlator includes a memory which stores a table that links said identifier to said multiple network addresses.

13. A method according to claim 1 wherein said request for said service is generated by typing said request via a keyboard on said terminal.

14. A method according to claim 1 wherein said request for said service is generated by selecting an icon, that corresponds to said request, via a monitor on said terminal.

* * * * *